US012715354B1

(12) United States Patent
Robertson et al.

(10) Patent No.: US 12,715,354 B1
(45) Date of Patent: Aug. 25, 2026

(54) ADJUSTABLE VEHICLE LAMP AND VEHICLE LAMP ADJUSTMENT METHOD

(71) Applicant: Ford Global Technologies, LLC, Dearborn, MI (US)

(72) Inventors: Michael Robertson, West Bloomfield, MI (US); Nicholas C. Sharpe, Dearborn, MI (US); Ketan K. Desai, Farmington Hills, MI (US); Ricardo Filho, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 19/250,204

(22) Filed: Jun. 26, 2025

(51) Int. Cl.
*B60Q 1/076* (2006.01)
*B60Q 1/04* (2006.01)

(52) U.S. Cl.
CPC ............ *B60Q 1/076* (2013.01); *B60Q 1/045* (2013.01); *B60Q 1/0483* (2013.01)

(58) Field of Classification Search
CPC ...... B60Q 1/076; B60Q 1/045; B60Q 1/0483; B60Q 1/06; B60Q 1/064; B60Q 1/068; B60Q 1/0683; B60Q 1/072; B60Q 1/08
See application file for complete search history.

(56) References Cited

U.S. PATENT DOCUMENTS

| | | | | |
|---|---|---|---|---|
| 4,884,174 | A | 11/1989 | Dorleans | |
| 8,577,556 | B1 * | 11/2013 | Noel, II | B60Q 1/18 701/49 |
| 10,001,254 | B2 | 6/2018 | Mayer | |
| 11,370,351 | B2 | 6/2022 | Sugimoto | |
| 11,420,550 | B2 * | 8/2022 | Berger | B60Q 1/068 |
| 2017/0129388 | A1 * | 5/2017 | Ramos Valencia | B60Q 1/0076 |
| 2020/0164789 | A1 * | 5/2020 | Tajima | B60Q 1/0683 |

FOREIGN PATENT DOCUMENTS

| | | | |
|---|---|---|---|
| CN | 202794722 | U | 3/2013 |
| DE | 102017108821 | A1 | 11/2017 |
| FR | 2844759 | A1 | 3/2004 |

* cited by examiner

*Primary Examiner* — Bao Q Truong
(74) *Attorney, Agent, or Firm* — Vichit Chea; Carlson, Gaskey & Olds, P.C.

(57) ABSTRACT

A vehicle lamp assembly includes a light adjustably securable to a vehicle structure of a vehicle. The light is configured to adjust by tilting the light relative to a centerline of the vehicle. A vehicle lamp adjustment method includes adjusting a headlamp of a vehicle by tilting the headlamp about a roll axis.

20 Claims, 3 Drawing Sheets

10
14
14
18
22

Z
Y
36
Vehicle Structure
22
Z
V
X
34
30
26

36
Vehicle Structure
22
34
30
26
Y
X

Yaw
34
Pitch
38
30
40
T2
T1
26
48
Roll
34
58
70
44
34

ADJUSTABLE VEHICLE LAMP AND VEHICLE LAMP ADJUSTMENT METHOD

TECHNICAL FIELD

This disclosure relates to a vehicle lamp, such as a headlamp, that can be tilted relative to a centerline of a vehicle to adjust where the headlight is aimed. The tilting is about a roll axis of the headlamp.

BACKGROUND

Vehicles can include various lamp assemblies, such as headlamps and taillamps. From time to time, it may be necessary to adjust the position of the lamp assemblies. The adjustments may be required to accommodate build variations, so that the lamp assemblies emit a desired beam pattern, or both.

SUMMARY

In some aspects, the techniques described herein relate to a vehicle lamp assembly, including: a light adjustably securable to a vehicle structure of a vehicle, the light configured to adjust by tilting the light relative to a centerline of the vehicle.

In some aspects, the techniques described herein relate to a vehicle lamp assembly, wherein the tilting is about an X axis of the light.

In some aspects, the techniques described herein relate to a vehicle lamp assembly, wherein the tilting is about a roll axis of the light.

In some aspects, the techniques described herein relate to a vehicle lamp assembly, wherein the light is further configured to adjust by tilting forward and rearward relative to the vehicle structure.

In some aspects, the techniques described herein relate to a vehicle lamp assembly, wherein the light is further configured to adjust by pivoting about a vertical axis relative to the vehicle structure.

In some aspects, the techniques described herein relate to a vehicle lamp assembly, wherein the light is further configured to adjust by tilting forward and rearward relative to the vehicle structure, wherein the light is further configured to adjust by pivoting about a vertical axis relative to the vehicle structure.

In some aspects, the techniques described herein relate to a vehicle lamp assembly, wherein the light is a first headlamp of the vehicle, and further including a second headlamp of the vehicle, the second headlamp the light configured to adjust by tilting relative to the centerline of the vehicle.

In some aspects, the techniques described herein relate to a vehicle lamp assembly, wherein the light is a constituent of a headlamp of the vehicle.

In some aspects, the techniques described herein relate to a vehicle lamp assembly, further including a mounting bracket holding the light, the mounting bracket having a first connection point, a second connection point, and a third connection point, wherein a vertical aim adjustment actuator coupled to the mounting bracket at the first connection point is configured to pivot the mounting bracket to adjust a vertical aim of the light, wherein a roll aim adjustment actuator coupled to mounting bracket at the second connection point is configured to pivot the mounting bracket to adjust a roll aim of the light, the mounting bracket sliding relative to the third connection point when the roll aim adjustment actuator pivots the mounting bracket.

In some aspects, the techniques described herein relate to a vehicle lamp assembly, wherein the third connection point includes a protrusion of one of the bracket or the vehicle structure received within a slot in the other of the bracket or the vehicle structure, the slot oversized relative to the protrusion to permit sliding of the protrusion within the slot when adjusting the roll aim of the light.

In some aspects, the techniques described herein relate to a vehicle lamp assembly, wherein the first connection point and the third connection point are on a first side of the light, wherein the second connection point is on an opposite, second side of the light.

In some aspects, the techniques described herein relate to a vehicle lamp assembly, wherein the first side is an inboard side of the light, wherein the second side is an outboard side of the light.

In some aspects, the techniques described herein relate to a vehicle lamp assembly, further including a horizontal aim adjustment actuator coupled to the mounting bracket at the second connection point and configured to pivot the mounting bracket to adjust a horizontal aim of the light.

In some aspects, the techniques described herein relate to a vehicle lamp assembly, wherein the first connection point and the third connection point are on a first side of the light, wherein the second connection point is on an opposite second side of the light.

In some aspects, the techniques described herein relate to a vehicle lamp assembly, including: a driver side headlamp; a passenger side headlamp; and an adjustment system configured to adjust the driver side headlamp about a driver side headlamp roll axis and to adjust the passenger side headlamp about a passenger side headlamp roll axis.

In some aspects, the techniques described herein relate to a vehicle lamp assembly, wherein the adjustment system is further configured to adjust the driver side headlamp about a driver side headlamp pitch axis and a driver side headlamp yaw axis, and to adjust the passenger side headlamp about a passenger side headlamp pitch axis and a passenger side headlamp yaw axis.

In some aspects, the techniques described herein relate to a vehicle lamp assembly, wherein the driver side headlamp and the passenger side headlamp each include a light, a mounting bracket attached to the light, wherein the adjustment system includes a first roll axis adjustment actuator associated with the driver side headlamp and a second roll axis adjustment actuator associated with the passenger side headlamp.

In some aspects, the techniques described herein relate to a vehicle lamp adjustment method, including: adjusting a headlamp of a vehicle by tilting the headlamp about a roll axis.

In some aspects, the techniques described herein relate to a vehicle lamp adjustment method, further including adjusting the headlamp by tilting the headlamp about a pitch axis.

In some aspects, the techniques described herein relate to a vehicle lamp adjustment method, wherein the headlamp pivots about a connection point when tilting about the pitch axis, the connection point coupling a bracket of the headlamp to a vehicle structure, the bracket sliding relative to the connection point when adjusting the headlamp by tilting the headlamp about the roll axis.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The various features and advantages of this disclosure will become apparent to those skilled in the art from the following detailed description. The drawings that accompany the detailed description can be briefly described as follows.

DETAILED DESCRIPTION

This disclosure details exemplary adjustable lamp assemblies for a vehicle and, more particularly, lamp assemblies that can be tilted relative to a centerline of a vehicle. The tilting adjustments to the lamp assemblies can be characterized as adjustments about a roll axis of the lamp assemblies.

In the past, lamp assemblies, such as headlamps, have been adjustable about a pitch axis, a yaw axis, or both. A lamp assembly adjustable about a roll axis can facilitate aligning a beam of light emitted from the lamp assembly with a driving surface.

The ability to align the beam of light relative to a driving surface can be particularly useful in headlamps incorporating adaptive driving beams. Adjustments to these headlamps about a roll axis can help the headlamp meet glare testing goals.

Figures 1, 2:
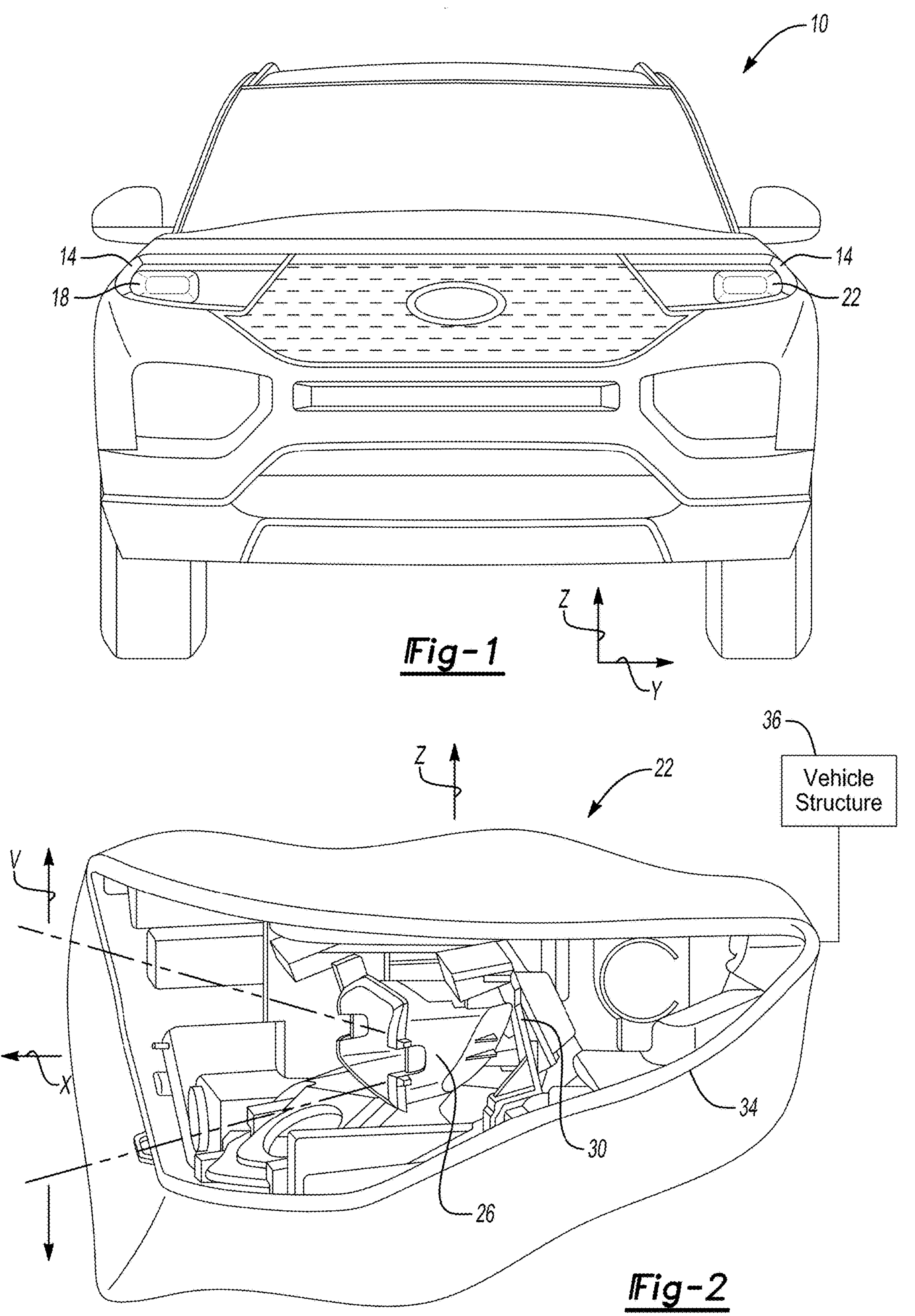
FIG. 1 is a front view of a vehicle having an adjustable driver side headlamp and an adjustable passenger side headlamp according to an exemplary embodiment of the present disclosure.
FIG. 2 is a side view of selected portions of the driver side headlamp of FIG. 1.
Figures 3, 4:
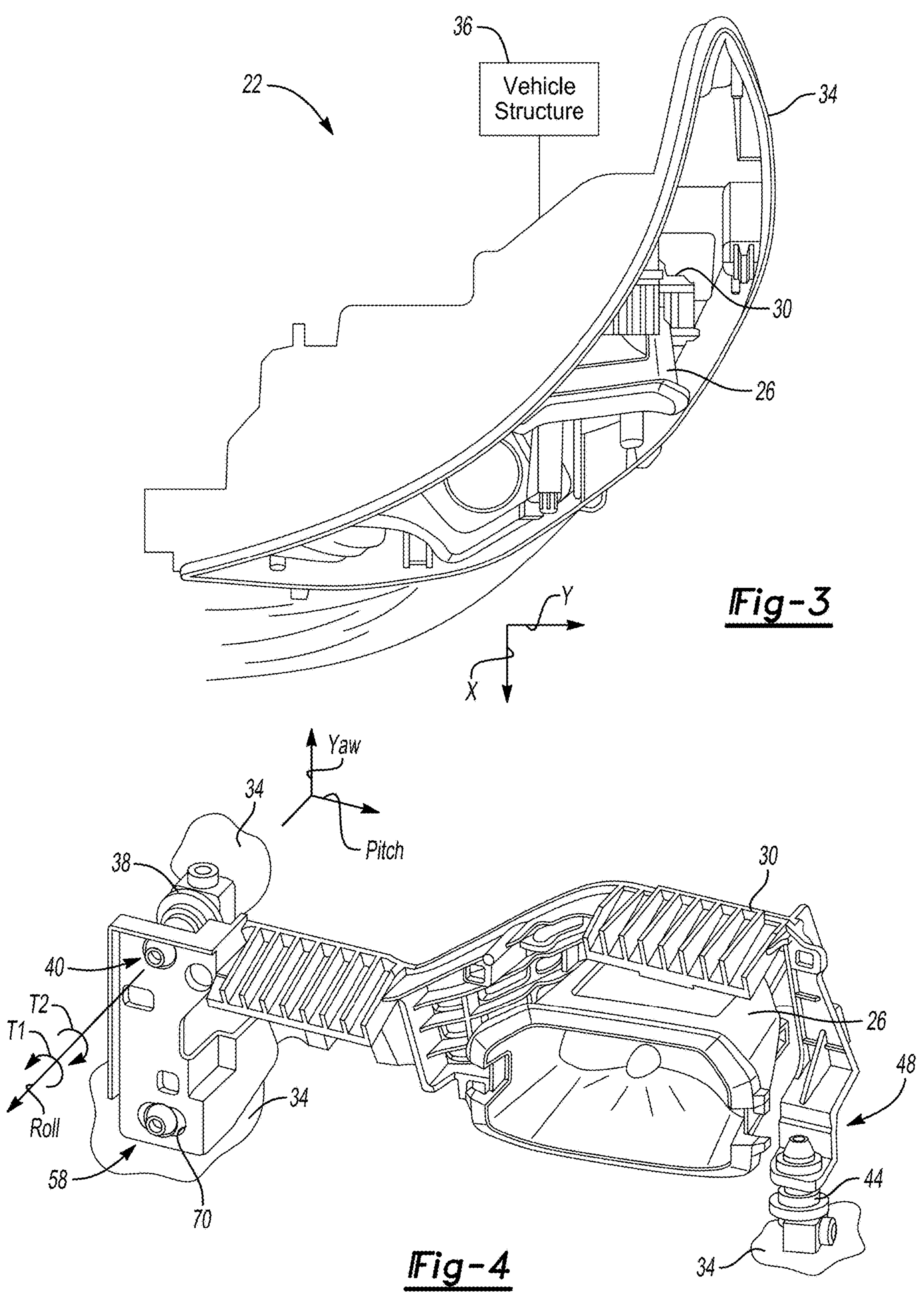
FIG. 3 is a top view of selected portions of the driver side headlamp of FIG. 1.
FIG. 4 is a perspective view of selected portions of the driver side headlamp of FIG. 1.
Figure 5:
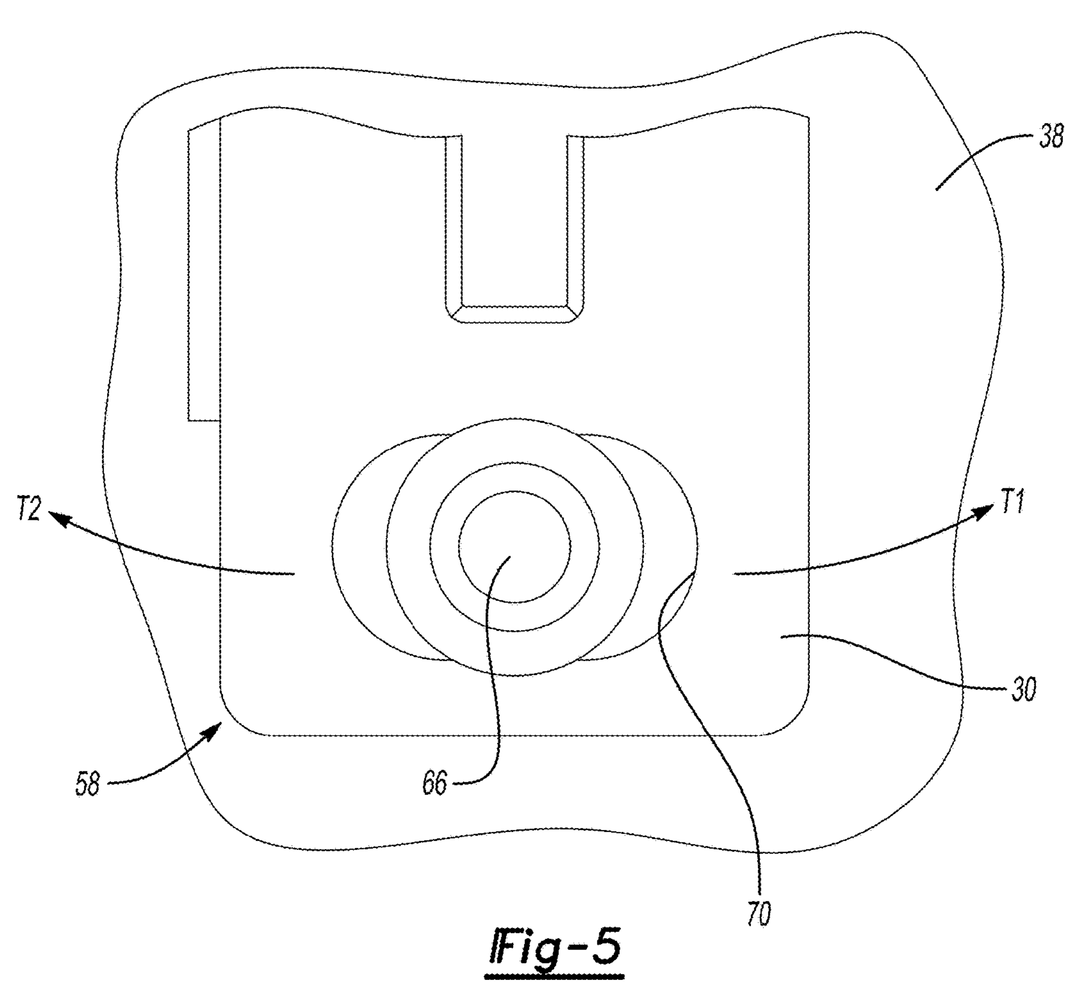
FIG. 5 is a close-up front view of a connection point of the driver side headlamp of FIG. 1.

With reference to FIG. 1, an example vehicle 10 includes headlamps 14, which are example lamp assemblies. The headlamps 14 can be activated to emit beams of light forward from the vehicle 10. The headlamps 14 include a passenger side headlamp 18 and a driver side headlamp 22. The vehicle 10 can include various other lamp assemblies, such as taillamps, indicator lamps, signal lamps, and daytime running lamps.

With reference now to FIGS. 2-5 and continuing reference to FIG. 1, the driver side headlamp 22 includes at least one light 26, a mounting bracket 30, and a housing 34. A lens (not shown) can cover the light 26 and the mounting bracket 30 within the housing 34. The passenger side headlamp 18 is constructed similarly to the driver side headlamp 22 but mirrored about a longitudinal centerline of the vehicle 10.

The mounting bracket 30 is attached to a vehicle structure 36 to secure the driver side headlamp 22 within the vehicle 10. The vehicle structure 36 can be, or can include, a fender, a body panel, a frame, or some combination of these. The vehicle structure 36 can be any fixed or semi-fixed part of the vehicle body or chassis that the housing 34 attaches to or references for alignment.

The vehicle 10, as would be understood by a person having skill in this art, has an X-axis, a Y-axis, and a Z-axis. The X-axis is often referred to as a longitudinal or roll axis. The Y-axis is often referred to as a transverse or pitch axis, and the Z-axis is often characterized as a vertical or yaw axis.

The driver side headlamp 22 includes a driver side headlamp roll axis parallel to the roll axis of the vehicle 10, a driver side headlamp pitch axis parallel to the pitch axis of the vehicle 10, and a driver side headlamp yaw axis parallel to the yaw axis of the vehicle 10.

In the exemplary embodiment, the driver side headlamp 22 includes a vertical aim adjustment actuator 38 is coupled to the mounting bracket 30 at a first connection point 40, and a roll aim adjustment actuator 44 coupled to the mounting bracket 30 at a second connection point 48. The mounting bracket 30 is coupled to the housing 34 at a third connection point 58. The first connection point 40, the second connection point 48 and the third connection point 58 could include ball studs.

The vertical aim adjustment actuator 38 is configured to extend and retract, which pivots the mounting bracket 30 to adjust a vertical aim V of the light 26. Pivoting the mounting bracket 30 to adjust the vertical aim V is a pivoting of the mounting bracket 30 about the driver side headlamp pitch axis.

Extending the vertical aim adjustment actuator 38 tips the light 26 forward and pivots the mounting bracket 30 and the light 26 about at least the third connection point 58 directing the vertical aim V downward. Retracting the vertical aim adjustment actuator 38 tips the light rearward and pivots the mounting bracket 30 and the light about at least the third connection point 58 directing the vertical aim V upward.

The pivoting of the mounting bracket 20 and the light 26 about the third connection point 58 is a pivoting of the mounting bracket 20 and the light 26 relative to the housing 34 and, because the housing 34 is fixed directly to the vehicle structure 36, a pivoting relative to the vehicle structure 36. As the housing 34 is not moved, fit and finish to surrounding areas is not changed due to the adjusting.

The roll aim adjustment actuator 44 is configured to pivot the mounting bracket 30 to pivot the light 26 to adjust a roll aim of the light 26. Extending the roll aim adjustment actuator 44 tilts the mounting bracket 30 and the light 26 in a direction T1. Retracting the roll aim adjustment actuator 44 tilts the mounting bracket 30 and the light 26 in a direction T2. The tilting of the driver side headlamp 22 is relative to a centerline of the vehicle 10. The roll aim adjustment actuator 44 can tilt the light 26 of the driver side headlamp 22 so that the light 26 is aligned with the light of the passenger side headlamp 18. In some examples, misalignment between the driver side headlamp 22 and the passenger side headlamp 18 about the roll axes can impact aim and can degrade a beam pattern of light emitted from the driver side headlamp 22 and the passenger side headlamp 18. Misalignment can be due to build variation, for example. Misalignment can also occur when turning an maneuvering the vehicle 10.

The vertical aim adjustment actuator 38 and the roll aim adjustment actuator 44 can be extended and retracted automatically as part of a lamp assembly adjustment system. The vertical aim adjustment actuator 38 and the roll aim adjustment actuator 44 can extend or retract in response to signals from a controller within the vehicle 10. The controller can command the extension or retraction of the vertical aim adjustment actuator 38, the roll aim adjustment actuator 44, or both based on, among other things, feedback about a position of the vehicle 10 relative to a surrounding area. The feedback could include a slope of a driving surface, for example. A person having skill in this art and the benefit of this disclosure could understand how to extend and retract an actuator in response to a command or feedback from sensors. The vertical aim adjustment actuator 38 and the roll aim adjustment actuator 44 could instead or additionally be manually extended and retracted by a technician during initial assembly of the vehicle 10 or when servicing the vehicle 10.

In the exemplary embodiment, the tilting inboard and outboard of the driver side headlamp 22 pivots the driver side headlamp 22 about the first connection point 40. In the exemplary embodiment, to permit the pivoting about the first connection point 40 when tilting the mounting bracket 30 and the light 26, the third connection point 58 includes a protrusion 66 from the housing 34 received within a slot 70 of the mounting bracket 30. The slot 70 is oversized relative to the protrusion 66 to permit sliding movement of the protrusion 66 within the slot 70 when the roll aim adjustment actuator 44 extends and retracts to tilt the mounting bracket 30 and the light 26 inboard and outboard.

Although the protrusion 66 is provided in the mounting bracket 30 and the slot 70 within the vehicle structure 36 in this example, the protrusion 66 could be provided within the vehicle structure 36 with the slot 70 provided within the mounting bracket 30.

In this example, the first connection point 40 and the third connection point 58 are disposed on an inboard side of the light 26, with the second connection point 48 and the roll aim adjustment actuator 44 disposed on an outboard side of the light 26.

Figure 6:
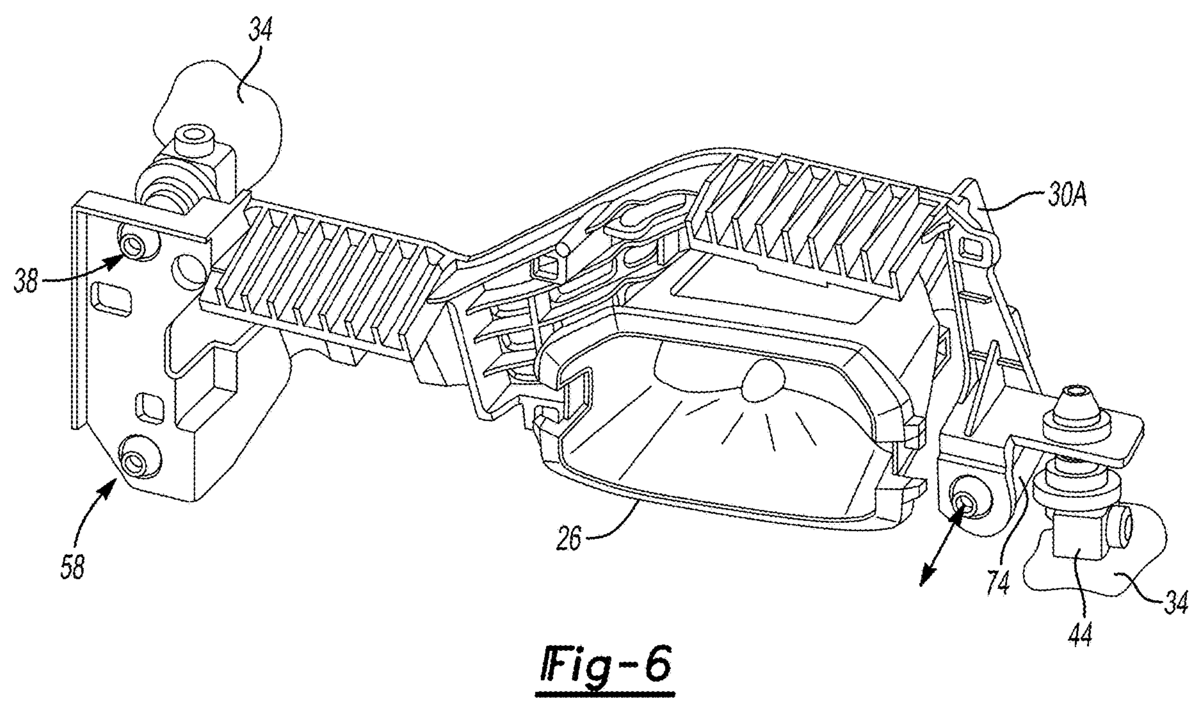
FIG. 6 is a perspective view of selected portions of a driver side headlamp according to another exemplary embodiment of the present disclosure.

With reference now to FIG. 6, another example lamp assembly 22A includes a bracket 30A that is modified relative to the mounting bracket 30 so that the bracket 30A can be pivoted by a horizontal aim adjustment actuator 74. Extending and retracting the horizontal aim adjustment actuator 74 pivots the mounting bracket 30 and thus the light 26 to adjust a horizontal aim of the light 26. The pivoting associated with the extension and retraction of the horizontal aim adjustment actuator 74 is a pivoting about a vertical axis or a yaw axis and, in this example, a pivoting about the first connection point 40 and the third connection point 58.

In yet another exemplary embodiment, the adjustments of the light 26 about a roll axis can be accomplished by raising or lowering an area of the mounting bracket 30 near the first connection point 40 to pivot the mounting bracket 30 and the light about the second connection point 48. The slot 70 can be changed to a vertically extending slot to accommodate raising and lowering of the mounting bracket 30 on the inboard side. The area near the first connection point 40 could be raised and lowered using a threaded rod adjustor coupled to or adjacent to the vertical aim adjustment actuator 38. The threaded rod adjustor could engage with a threaded rod socket molded in a housing of the vertical aim adjustment actuator 38.

Although the adjustable vehicle lamp is described in connection with the headlamp, the teachings of this disclosure could be applied to other lamp assemblies of the vehicle 10.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A vehicle lamp assembly, comprising:

a housing fixed to a vehicle structure of a vehicle; and a light housed within the housing and adjustably securable relative to the housing, the light configured to adjust by tilting the light relative to a centerline of the vehicle.

2. The vehicle lamp assembly of claim 1, wherein the tilting is about an X axis of the light.

3. The vehicle lamp assembly of claim 1, wherein the tilting is about a roll axis of the light.

4. The vehicle lamp assembly of claim 1, wherein the light is further configured to adjust by tilting forward and rearward relative to the vehicle structure.

5. The vehicle lamp assembly of claim 1, wherein the light is further configured to adjust by pivoting about a vertical axis relative to the vehicle structure.

6. The vehicle lamp assembly of claim 1, wherein the light is further configured to adjust by tilting forward and rearward relative to the vehicle structure, wherein the light is further configured to adjust by pivoting about a vertical axis relative to the vehicle structure.

7. The vehicle lamp assembly of claim 1, wherein the light is a first headlamp of the vehicle, and further comprising a second headlamp of the vehicle, the second headlamp configured to adjust by tilting relative to the centerline of the vehicle.

8. The vehicle lamp assembly of claim 1, wherein the light is a constituent of a headlamp of the vehicle.

9. The vehicle lamp assembly of claim 1, further comprising a mounting bracket holding the light, the mounting bracket having a first connection point, a second connection point, and a third connection point, wherein a vertical aim adjustment actuator coupled to the mounting bracket at the first connection point is configured to pivot the mounting bracket to adjust a vertical aim of the light, wherein a roll aim adjustment actuator coupled to the mounting bracket at the second connection point is configured to pivot the mounting bracket to adjust a roll aim of the light, the mounting bracket sliding relative to the third connection point when the roll aim adjustment actuator pivots the mounting bracket.

10. A vehicle lamp assembly, comprising:

a light adjustably securable to a vehicle structure of a vehicle, the light configured to adjust by tilting the light relative to a centerline of the vehicle; and a mounting bracket holding the light, the mounting bracket having a first connection point, a second connection point, and a third connection point, wherein a vertical aim adjustment actuator coupled to the mounting bracket at the first connection point is configured to pivot the mounting bracket to adjust a vertical aim of the light, wherein a roll aim adjustment actuator coupled to the mounting bracket at the second connection point is configured to pivot the mounting bracket to adjust a roll aim of the light, the mounting bracket sliding relative to the third connection point when the roll aim adjustment actuator pivots the mounting bracket;

wherein the third connection point comprises a protrusion of one of the bracket or the vehicle structure received within a slot in the other of the bracket or the vehicle structure, the slot oversized relative to the protrusion to permit sliding of the protrusion within the slot when adjusting the roll aim of the light.

11. The vehicle lamp assembly of claim 10, wherein the first connection point and the third connection point are on a first side of the light, wherein the second connection point is on an opposite, second side of the light.

12. The vehicle lamp assembly of claim 11, wherein the first side is an inboard side of the light, wherein the second side is an outboard side of the light.

13. The vehicle lamp assembly of claim 9, further comprising a horizontal aim adjustment actuator coupled to the mounting bracket at the second connection point and configured to pivot the mounting bracket to adjust a horizontal aim of the light.

14. The vehicle lamp assembly of claim 13, wherein the first connection point and the third connection point are on a first side of the light, wherein the second connection point is on an opposite second side of the light.

15. The vehicle lamp assembly of claim 1, wherein the light is a light of a driver side headlamp, and further comprising a passenger side headlamp; and an adjustment system configured to adjust the light of the driver side headlamp about a driver side headlamp roll axis and to adjust a light of the passenger side headlamp about a passenger side headlamp roll axis.

16. The vehicle lamp assembly of claim 15, wherein the adjustment system is further configured to adjust the light of the driver side headlamp about a driver side headlamp pitch axis and a driver side headlamp yaw axis, and to adjust a light of the passenger side headlamp about a passenger side headlamp pitch axis and a passenger side headlamp yaw axis.

17. The vehicle lamp assembly of claim 15, wherein the adjustment system includes a first roll axis adjustment actuator associated with the driver side headlamp and a second roll axis adjustment actuator associated with the passenger side headlamp.

18. A vehicle lamp adjustment method, comprising:

adjusting a headlamp of a vehicle by tilting the headlamp about a roll axis; and adjusting the headlamp by tilting the headlamp about a pitch axis, wherein the headlamp pivots about a connection point when tilting about the pitch axis, the connection point coupling a bracket of the headlamp to a vehicle structure, the bracket sliding relative to the connection point when adjusting the headlamp by tilting the headlamp about the roll axis.

19. The vehicle lamp assembly of claim 1, wherein the housing remains stationary relative to the vehicle structure when the light is adjusted.

20. The vehicle lamp assembly of claim 1, wherein the light is configured to adjust by tilting relative to the centerline of the vehicle to align a beam of light emitted by the light relative to a driving surface.

* * * * *